Figure 1:
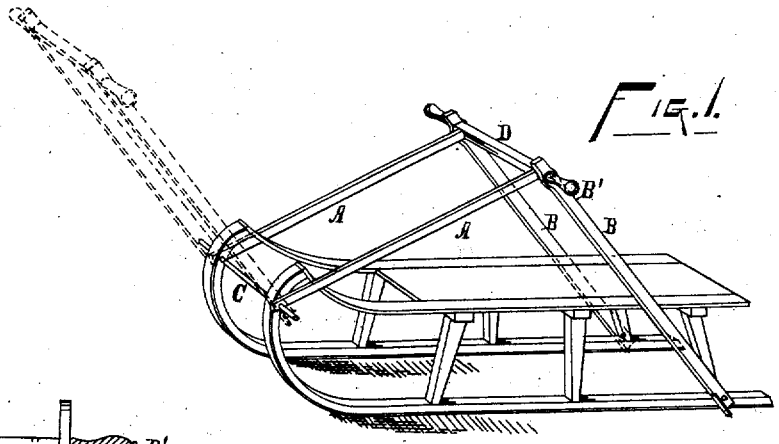

G. F. SHAVER.
Sled-Propeller.

No. 8,593. Reissued Feb. 18, 1879.

Witnesses,
Jas. S. Miller (Del.)
S. T. Price

Inventor,
George F. Shaver.
Per Jno K. Hallock
Att'y.

N. PETERS, PHOTO-LITHOGRAPHER, WASHINGTON, D. C.

UNITED STATES PATENT OFFICE.

GEORGE F. SHAVER, OF ERIE, PENNSYLVANIA.

IMPROVEMENT IN SLED-PROPELLERS.

Specification forming part of Letters Patent No. 192,461, dated June 26, 1877; Reissue No. 8,593, dated February 18, 1879; application filed November 18, 1878.

*To all whom it may concern:*

Be it known that I, GEORGE F. SHAVER, of Erie, in the county of Erie and State of Pennsylvania, have invented certain new and useful Improvements in Devices for Propelling Vehicles; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

The nature of my invention and its object and purpose will first be described and set forth in connection with the drawings in the following general description, and will then be pointed out in the claims.

In the drawings my device is shown in connection with a sled.

Figure 3:
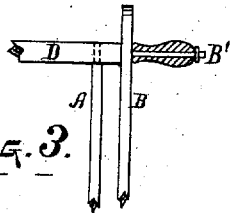
Figure 2:
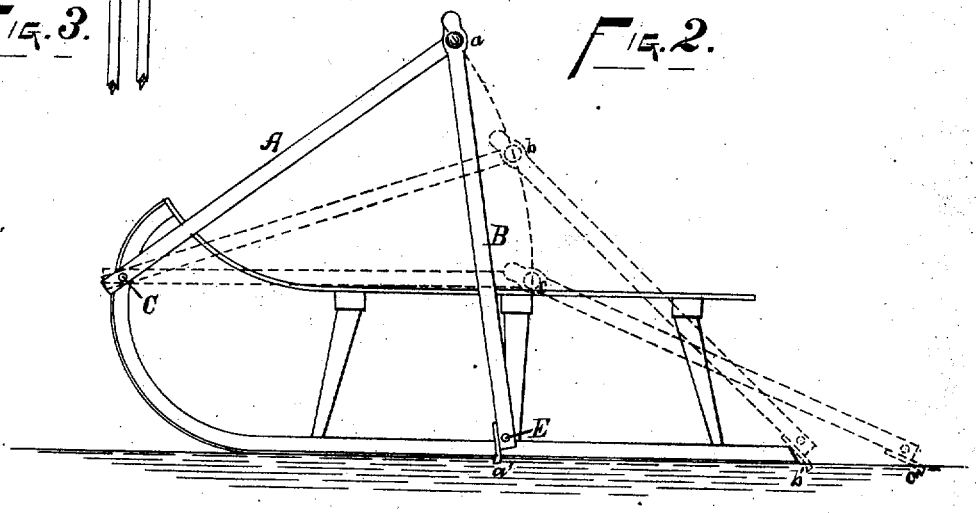

Figure 1 is a perspective view of a sled with one of my propelling devices attached. Fig. 2 is a side view of the sled, and the operation of the propeller is pointed out by dotted lines. Fig. 3 is a view showing details of construction.

One of the objects of my invention is to provide a propelling device by which the operator can obtain speed when riding where there is little resistance, or can obtain power where there is much resistance, without materially changing the speed of action or the power applied, and this without coupling or uncoupling any part of the device.

Another object of my invention is to so construct the propeller that it may serve as a tongue to draw the vehicle to which it is attached, if desired.

My propelling device consists of two bars, A and B, substantially of equal length, and which are pivoted together, and one of which, A, is pivoted to the forward part of the sled, as on the rung C. That the power applied to propel the sled may be applied properly, I use a pair of these propellers, one on each side of the sled, as seen in Fig. 1.

It is essential that the bars A and B should be of substantially equal length, and that the bar A should be pivoted very near the front part of the sled. These bars can fold together when not in use as a propeller, as shown by dotted lines in Fig. 1, and thus form a tongue for the sled.

The lower end of the bar B is provided with a metallic shoe or pike, to prevent its slipping or wearing off.

At the pivotal point of the two bars A B there is attached a handle, B′, which projects sidewise. It is quite essential that this handle should be in the position shown—that is, lying in a line at right angles to the line of action of the levers; or, in other words, the handles are horizontally transverse the sled. In that position the hand of the operator is never liable to be caught in between the bars.

In this instance the handle B′ is rigidly attached to one of the bars, and the pivot-pin of the other lever passes through it loosely, thus forming the joint, which construction is advantageous, in that it gives a long bearing to the pivotal joint, which gives stiffness to the joint. This construction is fully shown in Fig. 3.

The object of Fig. 2 is to fully illustrate the operation of the propellers, and it fully shows how the device can be operated to secure speed or power, as desired, without increasing the power or the speed used to propel it.

It will be seen that the device is operated as follows: The operator is seated on the sled, and grasps the handles B′ in his hands. By moving his hand up and down the bar B pushes the sled along. The arc of motion of the hands may be represented by the dotted curve *a b c*. When the hands move through the arc *a b* the foot of the propeller is moved through the space *a′ b′*, which is more than twice the length of the arc *a b*. When the hands are moved through the arc *b c* the propeller-foot moves from *b′* to *c′*, about one-third the distance from *a′* to *b′*. The arcs *a b* and *b c* are of equal length, and, if we suppose the operator to apply the same power and occupy the same time whether working the handles through the arc *a b* or *b c*, the sled will be propelled nearly three times as fast while the handles are passing through the upper arc as it is when they are passing through the lower arc, the resistance being the same.

It will thus be seen that when the handles are worked through the upper arc great speed can be obtained, and if worked through the lower arc less speed, but greater power, is the result. This being the case, the operator will adapt his movement of the handles to the requirements—as, for example, when on a level he will work in the upper arc and obtain speed without changing the speed of his motion or the power exerted; but when going uphill he will work in the lower arc, and gain power without exerting himself more than before.

It will be seen that these changes can be made by the operator instantly, and without altering or changing or uncoupling and recoupling any of the parts of the mechanism. It is obvious that these results are accomplished by the form of leverage employed—the toggle, formed of two levers of substantially equal length—and the manner of its adjustment to the vehicle and to the occupant of the vehicle.

The essentials of this construction and adjustment are as follows: The lever or bar A is of sufficient length to be pivoted at or near the front end of the sled and have its arc of motion in such a position that its chord will be nearly parallel with the body of the operator.

I am aware of the patent to D. W. De Forest, dated December 7, 1875, No. 170,715, and I disclaim any part of the invention there shown, as my device operates entirely differently.

What I claim as my invention is—

1. A propelling device for vehicles consisting of the bars A B, of substantially equal length, pivoted together so as to form a toggle-lever, of which the outer end of one bar is pivoted to the vehicle at or near its forward end, and the outer end of the other bar rests on the ground, and the arc of motion of the knuckle so passes in front of the operator that its chord is substantially parallel with his body, as and for the purposes set forth.

2. In a vehicle-propeller which is composed of bars A B, pivoted together so as to form a toggle, the handle B′, placed at the knuckle of said toggle, and forming a bearing or box for the pivot, substantially as and for the purposes set forth.

3. A vehicle-propeller consisting of the bars A B, coupled together so as to form a toggle, and which, when not in use as a propeller, are adapted to be folded together, so as to form a tongue for said vehicle, substantially as shown.

In testimony that I claim the foregoing I have hereunto set my hand this 7th day of November, 1878.

GEORGE F. SHAVER.

Witnesses:
JNO. K. HALLOCK,
S. S. SPENCER.